United States Patent
Burroughs

[11] Patent Number: 6,130,864
[45] Date of Patent: Oct. 10, 2000

[54] METHOD AND APPARATUS FOR GENERATING MAGNETIC FIELD FOR MAGNETO-OPTIC RECORDING SYSTEM

[75] Inventor: Alan C. Burroughs, San Jose, Calif.

[73] Assignee: Terastor Corporation, San Jose, Calif.

[21] Appl. No.: 09/262,970

[22] Filed: Mar. 4, 1999

[51] Int. Cl.[7] ................................................. G11B 11/00
[52] U.S. Cl. ............................................. 369/13; 369/112
[58] Field of Search .......................... 369/13, 112, 44.21, 369/44.22, 14; 300/114, 59

[56] References Cited

U.S. PATENT DOCUMENTS

| | | | |
|---|---|---|---|
| 4,890,178 | 12/1989 | Ichihara | 360/114 |
| 5,150,338 | 9/1992 | Birecki et al. | 369/13 |
| 5,497,359 | 3/1996 | Mamin et al. | 369/44.15 |
| 5,712,842 | 1/1998 | Yamamoto et al. | 369/112 |
| 5,828,644 | 10/1998 | Gage et al. | 369/112 |
| 5,859,814 | 1/1999 | Kino et al. | 369/13 |
| 5,881,042 | 3/1999 | Knight | 369/99 |
| 5,883,872 | 3/1999 | Kino | 369/112 |
| 5,886,959 | 3/1999 | Bischoff et al. | 369/13 |
| 5,914,915 | 6/1999 | Watanabe et al. | 369/13 |
| 6,009,064 | 12/1999 | Hajjar | 369/112 |
| 6,044,041 | 3/2000 | Ishizaki et al. | 369/13 |

FOREIGN PATENT DOCUMENTS 8-212579   8/1996   Japan ...................................... 369/13

*Primary Examiner*—Tan Dinh
*Attorney, Agent, or Firm*—Fish & Richardson P.C.

[57] ABSTRACT

A system for generating a magnetic field for magneto-optic recording that includes a near-field lens, a coil etched or plated into the bottom surface of the lens forming a coil layer, an insulating layer coupled to the coil layer, and a transparent conducting layer coupled to the insulating layer. The inner turn end of the coil is connected to a selected contact point on the transparent conducting layer through an opening in the insulating layer. The insulating layer insulates the coil layer from the transparent conducting layer.

40 Claims, 3 Drawing Sheets

METHOD AND APPARATUS FOR GENERATING MAGNETIC FIELD FOR MAGNETO-OPTIC RECORDING SYSTEM

TECHNICAL FIELD

The present specification generally relates to magneto optical recording. More particularly, the present specification describes structure and technique for generating a magnetic field for a magneto-optic recording system.

BACKGROUND

A system using a magneto-optic recording material desirably produces a magnetic field having a component perpendicular to the recording layer at the location where the light beam is focused. A conventional magnetic head used in such magneto-optical recording is constructed by winding a coil around a magnetic core. The coil around the magnetic core is used for generating the magnetic field. A large coil is often undesirable for generating high frequency recording, since large coil inductance prohibits changes of current at a desired high data rate.

The bottom surface of a near-field lens can be etched, ion-milled or cut away to form a mesa-like structure and allow a magnetic coil to be formed about the focused beam. This operation is described in PCT Publication No. 817,315. Generally, the width of the rectangle is narrow, but the length is long enough to include the field-of-view of the near field lens so that the maximum tracking range is available by steering the beam along the length of the mesa structure. The structure also should be thick enough to allow winding of a coil having one or more turns. It is also useful for the mesa to extend below the level of the coil to avoid the coil interfering with the air bearing surface of the slider.

Multiple layers of coils may be used to increase the magnetic efficiency. The typical magnetic field to change the magnetic state of the magneto-optical medium is approximately in a range from 80 to 300 Oersteds.

SUMMARY

The inventor noticed that by embedding a single layer coil that is etched or plated into the surface of a flying head, various production processes can be simplified. Advantages derived from simplification include elimination of a "mesa" type protrusion, a smaller coil size, and reduced localized heating. The inner turn end of the embedded coil can be connected to a conducting layer through an opening in an insulating layer. The current to both the coil and the conducting layer can therefore be supplied from one single current source. The conducting layer serves both as an electrical contact for the coil and as a head surface heater.

The present disclosure describes a system for generating a magnetic field for magneto-optic recording that includes a nearfield lens, a coil etched or plated into the flat bottom surface of the lens forming a coil layer, an insulating layer coupled to the coil layer, and a transparent conducting layer coupled to the insulating layer. The inner turn end of the coil is connected to the transparent conducting layer. The insulating layer insulates the coil layer from the transparent conducting layer.

In a preferred embodiment, the ends of the coil are connected to a pair of current contacts that supply current into the coil. The inner turn end connects to one of the contacts through the conducting layer. The outer turn end connects to the other contact. The pair of current contacts connect to a current supply. The current supply may be configured to supply at least 60 milliamps of current in certain systems.

The coil can be made of copper material in a single-layer configuration. The insulating layer can be made of $Al_2O_3$ material. The conducting layer can be made of Indium Tin Oxide material, which is transparent to allow the laser beam to pass through onto the recording medium on the disk.

In another preferred embodiment, the near-field lens is a hemisphere or super-sphere solid immersion lens with the flat bottom surface adapted for location less than a wavelength away from a recording medium. The lens operates in a near-field configuration with evanescent coupling of laser energy creating sub-wavelength recorded feature size.

In an alternative embodiment, the near-field lens is a solid immersion mirror with the flat bottom surface less than a wavelength away from a recording medium.

In another alternative embodiment, the near-field lens is a high-index material with a diffractive optical element lens coupled to the flat bottom surface.

The present disclosure also includes a method of reading and writing data on a magneto-optic media. The method includes adapting a first lensing surface of an optical lens to face toward a source of optical radiation; adapting a second lensing surface to face toward the magneto-optic media; forming an electrically-actuable coil structure on the second lensing surface; and electrically energizing the electrically-actuable coil structure to produce a magnetic field. The optical radiation is then allowed to pass through an optically transparent portion of the electrically-actuable coil structure.

Other embodiments and advantages will become apparent from the following description and from the claims.

BRIEF DESCRIPTION OF THE DRAWINGS

Like reference numbers and designations in the various drawings indicate like elements.

DETAILED DESCRIPTION

The present disclosure describes a system for generating a magnetic field with an embedded coil that is etched or plated into the surface of a flying head. The embedded coil provides the magnetic flux for writing data on a magneto-optic media.

A magneto-optical storage system with a flying head is described in U.S. patent application Ser. No. 08/846,916, the disclosure of which is herein incorporated by reference. The above application describes a magneto-optical storage system with a flying head for a near-field situation. A high index solid immersion lens is used as the near-field lens. The disclosure also describes various methods of forming a mesa-like structure that can be used to allow a coil to be formed around the focused beam.

Figure 1:
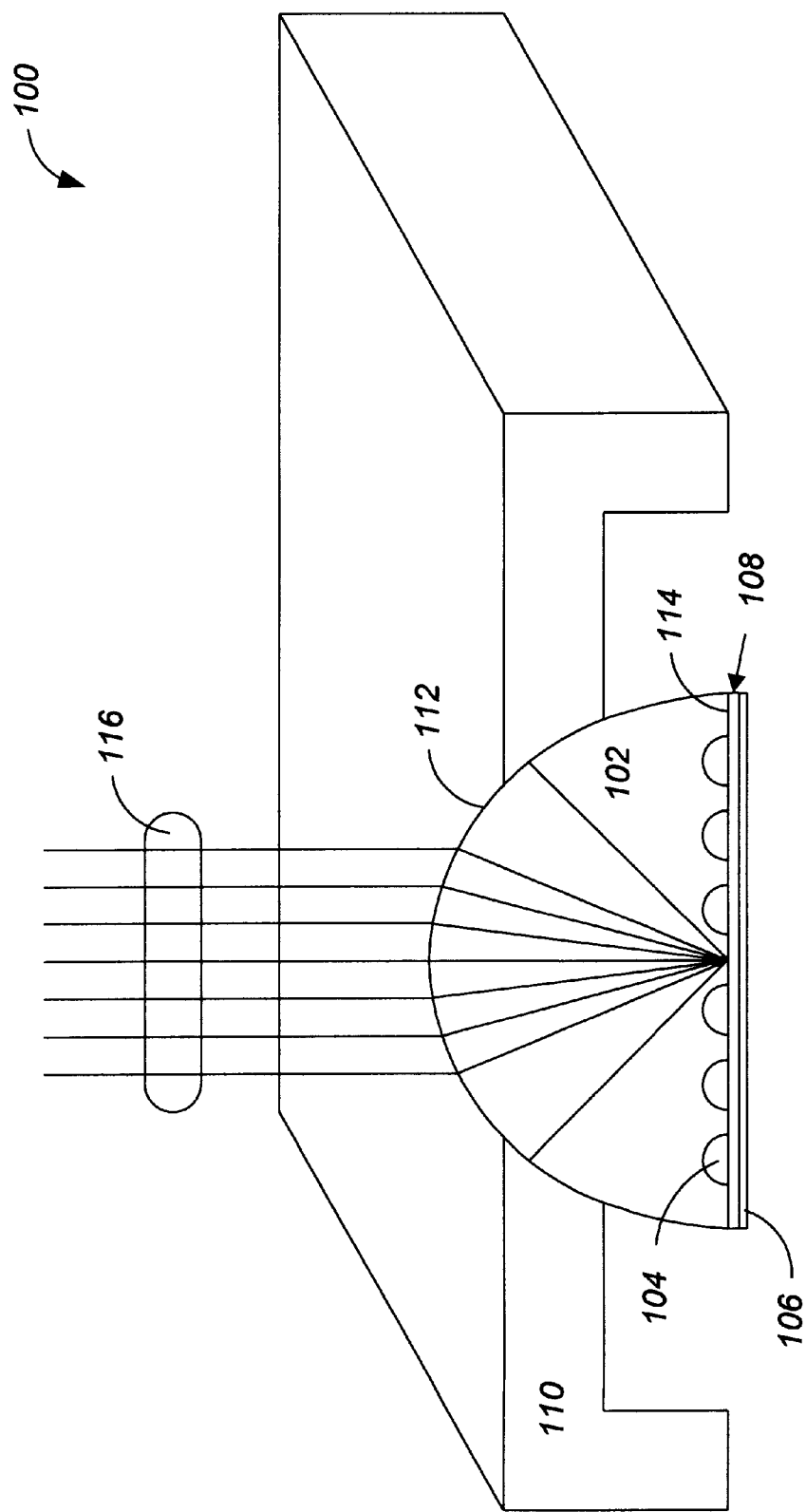
FIG. 1 is a cross-sectional view of a preferred embodiment of a flying head mechanism.

FIG. 1 shows a cross-sectional view of one embodiment of the optical portion of the flying head mechanism 100. The flying head mechanism 100 shown in FIG. 1 includes an objective lens 116, an optical lens 102 and a slider 110. The slider 110 is used to move the flying head mechanism.

In a preferred embodiment, the optical lens 102 is a near-field lens. The near-field lens 102 and has a spherical surface 112 and a flat bottom surface 114. The near-field lens can be a hemisphere or super-sphere solid immersion lens. The near-field lens 102 operates in a near-field configuration in which evanescent coupling of laser energy is used to create sub-wavelength recorded feature size.

In another embodiment, the near-field lens 102 can be a solid immersion mirror or a diffractive lens.

A single-layer copper coil 104 is etched or plated into the bottom surface 114 of the near-field lens 102. The bottom surface 114 is lapped substantially flat. A layer of $Al_2O_3$ insulator 108 is attached to the bottom surface 114. Finally, a layer of electrically conducting transparent material 106, e.g., Indium Tin Oxide (ITO), is attached to the insulating layer 108. The insulating layer 108 electrically isolates the copper coil 104 from the layer of ITO 106. Layers 106 and 108 are substantially transparent. Substantially, no photoresistive material is left behind in the finished process. This can allow the coil to operate at higher temperatures.

Figure 2:
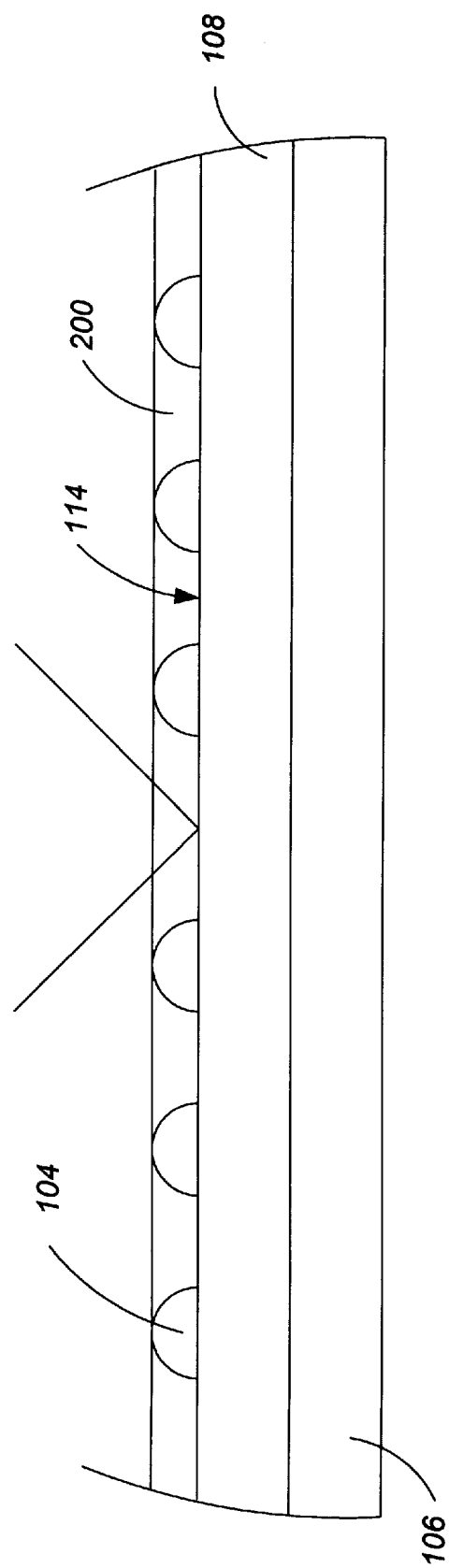
FIG. 2 is a detailed cross-sectional view of the preferred embodiment of the embedded coil system.

FIG. 2 shows a detailed cross-sectional view of the embedded coil system. The coil 104 is etched into the flat bottom surface 114 of the hemispherical lens forming a coil layer 200. The ITO layer 106 acts as a conducting layer to supply current to the coil 104 for generating magnetic field. The ITO layer 106 can also act as a head surface heater. The head surface heater is described in U.S. patent application Ser. No. 09/227,778, filed Jan. 8, 1999, and entitled "HEATED HEAD FOR DATA STORAGE SYSTEMS," Vlad Novotny et al.

Figure 3:
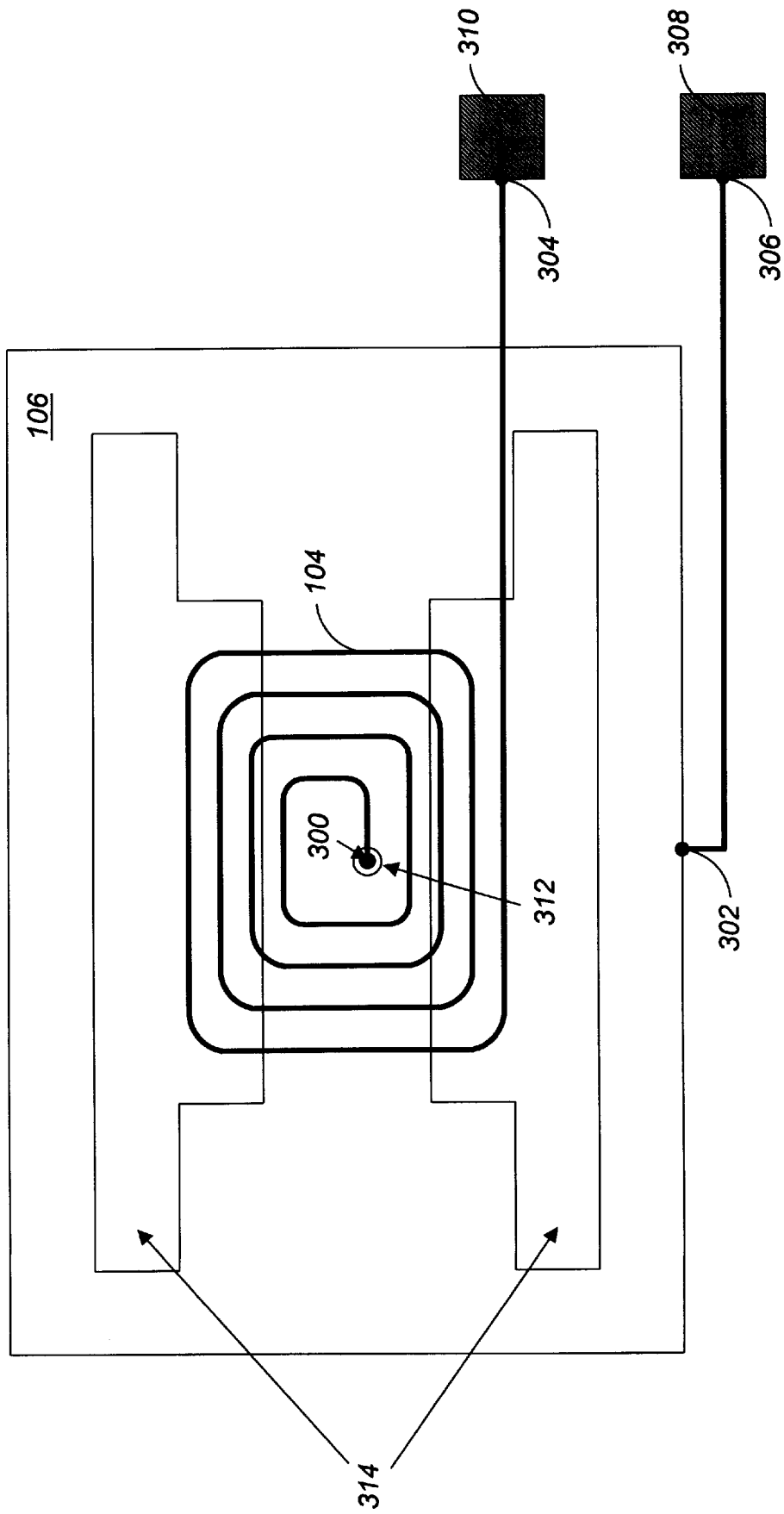
FIG. 3 is a bottom view of a flying head mechanism with the coil connections highlighted.

FIG. 3 shows a bottom view of the flying head with the coil 104 connections highlighted. FIG. 3 also shows the air-bearing surfaces 314 of the flying head. The inner turn end 300 of the single-layer coil 104 is brought to the edge of the slider 110 by connecting the end 300 to the ITO layer 106. The connection to the ITO layer 106 is made by an opening through the insulator 108. The opening is a masked hole 312 that allows the inner turn end 300 to attach to the ITO layer 106 through the insulating layer 108. The current flows from node 300 to 302 through the current conducting ITO layer 106. The node 302 is connected to a contact 308 at node 306. The outer turn end is connected to another contact 310 at node 304.

Current is applied at the contacts 308 and 310. When the current flows from the contact 308 to 310, the magnetic field is formed in the plane perpendicular to and out of the page. When the current flows from the contact 310 to 308, the magnetic field formed is into the page.

In a particular embodiment, the coil is 3 $\mu$m wide, 3 $\mu$m deep, and has 12 turns with inner turn dimensions of 12 $\mu$m by 40 $\mu$m.

The embedded coil of the present disclosure includes a number of advantages. A "mesa" type protrusion in the flying head can be eliminated. A mesa structure allows the magnetic coil to be formed around the converging optical beam. Therefore, the mesa structure must be constructed long enough and wide enough to allow the focused beam to converge without being clipped by the structure and to allow for tracking servo excursion of the beam. The mesa structure must also be tall enough to allow the placement of the magnetic coil around the mesa, and yet not so tall as to clip the converging beam.

The elimination of the mesa structure also allows forming a smaller embedded coil. This can be much smaller than the conventional magnetic coil wound around a mesa structure. The smaller opening for the exit beam makes a tightly-wound coil possible. The smaller coil also provides more flux density for the same dissipated power. Hence, the smaller coil produces less heat. The heat is undesirable since it can deform the slider assembly via localized heating.

All of the above mentioned advantages simplify the production process and reduce optical aberration problems. In addition, the embedded coil system also eliminates the need for permalloy or other field-enhancing material since the coil can be produced in a single-layer configuration. The smaller single-layer coil can have lower inductance than the conventional multi-layer coil system and can have a significantly higher field intensity. The lower inductance is desirable for generating high frequency recording because it allows changes of current at a desired high data rate.

The embedded coil system also allows the coil and the ITO heater structure to be run by a single current source with only two electrical leads. In prior configurations of the conventional magnetic coil wound around a mesa structure where the coil and the ITO were electrically isolated, four electrical leads to the head were required, two for the coil and two for the ITO heater structure.

A number of embodiments of the present disclosure have been described. Nevertheless, it will be understood that various modifications may be made without departing from the spirit and scope of the invention.

For example, although a hemispherical solid immersion lens is used as an exemplary near-field lens, it should be understood that the same techniques can be applied with other types of near-field lenses or other near-field optical elements, including, a near-field lens formed of radially graded index rod, a solid immersion mirror, a tapered optical fiber near-field recording head, or a high-index slide with a diffractive optical element. See Lee et al., "Feasibility study on near field optical memory using a catadioptric optical system," Optical Data Storage, 1998 Technical Digest Series, Vol. 8 and Japanese laid-open patent application No. 8-245053 by Hatakoshi et al., which are incorporated herein by reference. The single-layer coil may be in general embedded in a flat surface of the flying head that interfaces with the storage medium.

For another example, while the disclosure has been described in terms of a near-field lens, the disclosure may be implemented in a far-field situation where the bottom surface of the lens is greater than a wavelength away from the recording medium. These and other variations are intended to be fully encompassed by the following claims.

What is claimed is:

1. A magneto-optic recording system, comprising:

an optical lens, having a first lensing surface adapted to face toward a source of optical radiation, and a second lensing surface adapted to face toward a magneto-optic media;

a coil layer, having a coil etched or plated into the second lensing surface, said coil configured to provide magnetic field; and a transparent conducting layer operatively coupled with said coil layer, and operating to pass a focused beam of optical radiation, said transparent conducting layer also allowing electrical energy to pass through the coil and into said transparent conducting layer to produce the magnetic field.

2. The system of claim 1, wherein said optical lens is a near-field lens.

3. The system of claim 2, wherein the first lensing surface is spherical and the second lensing surface is substantially flat.

4. The system of claim 2, wherein the near-field lens is a hemisphere or super-sphere solid immersion lens with the second lensing surface adapted to be less than a wavelength away from a recording medium.

5. The system of claim 2, wherein the near-field lens is a solid immersion mirror with the second lensing surface adapted to be less than a wavelength away from a recording medium.

6. The system of claim 2, wherein the near-field lens is a high-index material with a diffractive optical element lens coupled to the second lensing surface.

7. The system of claim 1, wherein said optical lens is a far-field lens.

8. The system of claim 1, further comprising:
an insulating layer, operatively connected between said coil layer and said transparent conducting layer, and electrically isolating the coil from the transparent conducting layer.

9. The system of claim 8, wherein the coil has an inner turn end and an outer turn end, such that the inner turn end connects to a selected contact point in said transparent conducting layer through an opening in said insulating layer.

10. The system of claim 9, further comprising:
an electrical energy supply; and
a pair of electrical contacts, connecting to said inner turn end and said outer turn end, said pair of electrical contacts also connecting to said electrical energy supply for supplying the coil with electricity for producing the magnetic field.

11. The system of claim 8, wherein the insulating layer is made of $Al_2O_3$.

12. The system of claim 1, wherein the coil is formed from a copper material.

13. The system of claim 1, wherein the coil layer is in a single-layer configuration.

14. The system of claim 1, wherein the transparent conducting layer is formed from Indium Tin Oxide.

15. A magneto-optic recording system, comprising:
a solid immersion lens, having a spherical surface adapted to face toward a source of optical radiation, and a substantially flat surface adapted to face toward a magneto-optic media;
a coil layer, having a coil etched or plated into said substantially flat surface, such that said coil is electrically energizable to produce a magnetic field;
an optically transparent conducting layer operatively connected with said coil layer, such that an electrical energy passes through the coil and into said optically transparent conducting layer to produce the magnetic field, said optically transparent conducting layer also passing optical radiation through its transparent layer; and
an insulating layer, operatively connected between said coil layer and said transparent conducting layer, and electrically isolating the coil from the transparent conducting layer.

16. An optical flying head mechanism for magneto-optic recording, comprising:
a slider for moving the optical flying head mechanism;
an objective lens adapted to guide a collimated beam of radiation radiating from a source of optical radiation;
a near-field lens, having a first lensing surface adapted to face toward the objective lens, and a second lensing surface adapted to face toward a magneto-optic media, said near-field lens focusing the collimated beam of radiation onto a small area on the magneto-optic media;
a coil layer, having a coil etched or plated into the second lensing surface, said coil configured to provide magnetic field; and
a transparent conducting layer operatively coupled with said coil layer, and operating to pass the collimated beam of radiation, said transparent conducting layer also allowing electrical energy to pass through the coil and into said transparent conducting layer to produce the magnetic field.

17. The mechanism of claim 16, wherein the first lensing surface is spherical and the second lensing surface is substantially flat.

18. The mechanism of claim 16, wherein the near-field lens is a hemisphere or super-sphere solid immersion lens with the second lensing surface adapted to be less than a wavelength away from a recording medium.

19. The mechanism of claim 16, wherein the near-field lens is a solid immersion mirror with the second lensing surface adapted to be less than a wavelength away from a recording medium.

20. The mechanism of claim 16, wherein the near-field lens is a high-index material with a diffractive optical element lens coupled to the second lensing surface.

21. The mechanism of claim 16, further comprising:
an insulating layer, operatively connected between said coil layer and said transparent conducting layer, and electrically isolating the coil from the transparent conducting layer.

22. The mechanism of claim 21, wherein the coil has an inner turn end and an outer turn end, such that the inner turn end connects to a selected contact point in said transparent conducting layer through an opening in said insulating layer.

23. The mechanism of claim 22, further comprising:
an electrical energy supply; and
a pair of electrical contacts, connecting to said inner turn end and said outer turn end, said pair of electrical contacts also connecting to said electrical energy supply for supplying the coil with electricity for producing the magnetic field.

24. The mechanism of claim 21, wherein the insulating layer is made of $Al_2O_3$.

25. The mechanism of claim 16, wherein the coil is formed from a copper material.

26. The mechanism of claim 16, wherein the coil layer is in a single-layer configuration.

27. The mechanism of claim 16, wherein the transparent conducting layer is formed from Indium Tin Oxide.

28. A magneto-optical storage system, comprising:
an optical head mechanism, including an optical lens, said optical lens having a first optical surface adapted to face toward a source of optical energy, and a second optical surface adapted to face toward a magneto-optic storage media, such that the optical lens couples optical energy to and from the magneto-optic storage media;
a coil layer, having a coil etched or plated into the second lensing surface, said coil configured to provide magnetic field; and
a transparent conducting layer operatively coupled with said coil layer, and operating to pass a focused beam of optical radiation, said transparent conducting layer also allowing electrical energy to pass through the coil and into said transparent conducting layer to produce the magnetic field.

29. The system of claim 28, further comprising:
an insulating layer, operatively connected between said coil layer and said transparent conducting layer, and electrically isolating the coil from the transparent conducting layer.

30. The system of claim 29, wherein the coil has an inner turn end and an outer turn end, such that the inner turn end connects to a selected contact point in said transparent conducting layer through an opening in said insulating layer.

31. The system of claim 28, wherein said conducting layer is adapted to electrically heat said second optical surface in response to electrical energy.

32. The system of claim 28, wherein said optical lens is a solid immersion lens, such that the first optical surface is spherical, and the second optical surface is flat.

33. The system of claim 28, wherein said optical lens is a solid immersion mirror or a diffractive element for coupling light to the magneto-optic storage media.

34. A method of providing a magneto-optic recording, comprising:

adapting a first lensing surface of an optical lens to face toward a source of optical radiation, and a second lensing surface to face toward the magneto-optic media;

etching or plating a coil into the second lensing surface, said coil having an inner turn end and an outer turn end, and forming a coil layer;

coupling a transparent conducting layer to said coil layer for passing an electrical energy through the coil and into said transparent conducting layer, such that the electrical energy produces a magnetic field; and passing a focused beam of optical radiation through said transparent conducting layer.

35. The method of claim 34, further comprising:

electrically insulating said coil layer from said transparent conducting layer, forming an insulating layer.

36. The method of claim 35, wherein coupling the transparent conducting layer to the coil layer includes:

connecting the inner turn end of the coil to a selected contact point in the transparent conducting layer through an opening in said insulating layer.

37. The method of claim 35, wherein the insulating layer is made of $Al_2O_3$.

38. The method of claim 34, wherein the coil is formed from a copper material.

39. The method of claim 34, wherein the coil layer is in a single-layer configuration.

40. The method of claim 34, wherein the transparent conducting layer is formed from Indium Tin Oxide.

* * * * *